United States Patent [19]

Kawai et al.

[11] Patent Number: 5,780,374
[45] Date of Patent: Jul. 14, 1998

[54] HIGH-STRENGTH POROUS SILICON NITRIDE BODY AND PROCESS FOR PRODUCING THE SAME

[75] Inventors: Chihiro Kawai; Takahiro Matsuura; Akira Yamakawa, all of Itami, Japan

[73] Assignee: Sumitomo Electric Industries, Ltd., Japan

[21] Appl. No.: 774,612

[22] Filed: Dec. 30, 1996

[30] Foreign Application Priority Data

| Jan. 9, 1996 | [JP] | Japan | 8-001120 |
| Jan. 9, 1996 | [JP] | Japan | 8-001121 |
| Dec. 3, 1996 | [JP] | Japan | 8-322420 |

[51] Int. Cl.⁶ ............................ C04B 35/584
[52] U.S. Cl. .................. 501/97.1; 501/80; 501/97.2; 264/628; 264/676; 264/683
[58] Field of Search ............ 501/80, 97.1, 97.2; 264/628, 676, 683

[56] References Cited

U.S. PATENT DOCUMENTS

| 4,629,707 | 12/1986 | Wolfe | 501/97.2 |
| 5,004,709 | 4/1991 | Stranford et al. | 501/97.2 |
| 5,618,765 | 4/1997 | Takeuchi et al. | 501/97.1 |

FOREIGN PATENT DOCUMENTS

| 653392 | 5/1995 | European Pat. Off. |
| 62-7649 | 1/1987 | Japan. |
| 63-134554 | 6/1988 | Japan. |
| 1-59231 | 12/1989 | Japan. |
| 3-88744 | 4/1991 | Japan. |
| 3-141161 | 6/1991 | Japan. |
| 5-178641 | 7/1993 | Japan. |
| WO94/27929 | 12/1994 | WIPO. |

*Primary Examiner*—Karl Group
*Attorney, Agent, or Firm*—Bierman, Muserlian and Lucas

[57] ABSTRACT

A high-porosity and high-strength porous silicon nitride body comprises columnar silicon nitride grains and an oxide bond phase containing 2 to 15 wt. %, in terms of oxide based on silicon nitride, of at least one rare earth element, and has an $SiO_2/(SiO_2+\text{rare earth element oxide})$ weight ratio of 0.012 to 0.65 and an average pore size of at most 3.5 μm. The porous silicon nitride body is produced by compacting comprising a silicon nitride powder, 2 to 15 wt. %, in terms of oxide based on silicon nitride, of at least one rare earth element, and an organic binder while controlling the oxygen content and carbon content of said compact; and sintering said compact in an atmosphere comprising nitrogen at 1,650° to 2,200° C. to obtain a porous body having a three-dimensionally entangled structure made up of columnar silicon nitride grains and an oxide bond phase, and having an $SiO_2/(SiO_2+\text{rare earth element oxide})$ weight ratio of 0.012 to 0.65.

11 Claims, 3 Drawing Sheets

(a) y = −14.4x + 1300
(b) y = − 4.8x + 360

HIGH-STRENGTH POROUS SILICON NITRIDE BODY AND PROCESS FOR PRODUCING THE SAME

BACKGROUND OF THE INVENTION

1. Field of the Invention

The present invention relates to a porous silicon nitride body having a high porosity, a high strength and an excellent machinability, and a process for producing the same.

2. Description of the Prior Art

In order to cope with recent environmental issues with car exhaust gas and the like, there has been an increasing demand for a porous ceramic usable as a variety of filters, catalyst carriers and structural materials having a high heat resistance, a high strength and a high thermal shock resistance. For example, there have been desired a filter and a catalyst carrier for removal of $CO_2$, $NO_x$ and black smoke in car exhaust gas, and lightweight car parts for an improvement in respect of energy consumption.

A porous silicon nitride body has been proposed as a promising suitable material of this kind (PCT International Publication No. WO 94/27929). This porous silicon nitride body is a porous body having a high porosity of at least 30 vol. % as well as a high strength, a high toughness, a high thermal shock resistance and a high chemical resistance, wherein $\beta$-$Si_3N_4$ grains are mutually bonded with a bond phase comprising at least one compound of a rare earth element (i.e., Sc, Y or lanthanide elements) in such a way as to have a three-dimensionally entangled structure.

This porous silicon nitride body is obtained by mixing an $Si_3N_4$ powder with a rare earth element oxide as a sintering aid, compacting the resulting mixture, and then sintering the resulting compact in an atmosphere of pressurized nitrogen. The rare earth element oxide forms a liquid phase together with $SiO_2$ present on the surfaces of the $Si_3N_4$ powder through a eutectic reaction at a high temperature during sintering to melt part of the $Si_3N_4$ powder to thereby serve to precipitate columnar $Si_3N_4$ grains. This liquid phase exists as a glass phase or crystalline phase in grain boundaries after sintering, and strongly bonds the columnar $Si_3N_4$ grains to contribute to development of the high strength and high toughness properties of the porous $Si_3N_4$ body. Additionally stated, $Y_2O_3$ is cheapest and hence easily available among rare earth element oxides.

Sintering of an $Si_3N_4$ ceramic is usually effected under a suitable gas pressure applied thereto in order to prevent sublimation of $Si_3N_4$ at a high temperature. In the foregoing method of PCT International Publication No. WO 94/27929 as well, a gas pressure is applied likewise. For example, the higher the temperature, the higher the pressure necessary for preventing the sublimation. Accordingly, a maximum pressure of 10 atm is applied up to 1,900° C., a maximum pressure of 40 atm is applied at 2,000° C., and a maximum pressure of 100 atm is applied at 2,100° C., whereby the sublimation is prevented. Thus, in the foregoing method of PCT WO 94/27929, application of the gas pressure during sintering is aimed only at preventing the sublimation of $Si_3N_4$ at a high temperature.

Meanwhile, a dense ceramic usable as a general structural member, examples of which include alumina, silicon nitride and zirconia, is hard to work, whereas such a porous body is easily machinable and can therefore be cut and perforated into an arbitrary shape even without using a special tool such as a diamond cutter. This can greatly lower the working cost. On the other hand, however, such a conventional porous body is usually lowered in mechanical strength due to the presence of pores, and is therefore hard to put into practical use as a structural member. Under such circumstances, it has been desired to provide a porous body having an excellent workability as well as such a sufficient strength as to be put into practical use as a structural member. Additionally stated, the term "machinability" as used herein is intended to indicate such properties based on the universally accepted idea that a body can be smoothly subjected to working such as cutting, severance, perforation, or channeling with a drill, a saw, a cutting tool, etc. having an edge made of common carbon steel to form an arbitrary shape without cracking, chipping, etc. as if common wood is cut.

A mica-glass ceramic manufactured under the trade name of "MACOR" by Corning Glass Works Corp., which is the only material substantially of the prior art in an aspect of machinability, is said to have a little machinability. Since the substance of this product contains 30 to 40 vol. % of $KMg_3AlSi_3O_{10}F_2$, however, it is still hardly cut with a common carbon steel tool, and involves easy cracking and softening deformation at about 800° C. Thus, this ceramic product rather has a plurality of defects.

Glass ceramic materials further highly functionalized to be improved in strength and machinability have recently been developed, examples of which are disclosed in Japanese Patent Laid-Open No. 63-134554, Japanese Patent Publication No. 1-59231, Japanese Patent Laid-Open No. 62-7649, Japanese Patent Laid-Open No. 3-88744, and Japanese Patent Laid-Open No. 5-178641. However, both the ceramics as disclosed in Japanese Patent Laid-Open No. 63-134554 and Japanese Patent Publication No. 1-59231 have a flexural strength of at most 1,000 kg/cm² to be low in strength, and hence cannot be used as structural materials at all.

On the other hand, the glass ceramics as disclosed in Japanese Patent Laid-Open No. 62-7649, Japanese Patent Laid-Open No. 3-88744, and Japanese Patent Laid-Open No. 5-178641 are said to be well strengthened to a maximum flexural strength of 5,000 kg/cm² and have machinability such as workability with a drill. Since these glass ceramics are dense ceramics having a relative density close to about 100%, however, the machinability thereof, though improved, are not satisfactory at all. Besides, these glass ceramics are very high in cost because the process of producing crystallizable glass is complicated.

Besides the glass ceramics, a porous $Si_3N_4$—BN ceramic improved in strength and workability has been developed (Japanese Patent Laid-Open No. 3-141161). This is said to have a porosity of 6 to 15% and a flexural strength of at most 40 kg/mm², and to be machinable with a high speed steel cutting tool. However, this porous ceramic is still not well improved in workability because the porosity thereof is low.

SUMMARY OF THE INVENTION

In view of the foregoing circumstances of the prior art, an object of the present invention is to provide a porous silicon nitride body having an excellent machinability and usable as a lightweight structural member, wherein the strength thereof is further improved while keeping the porosity thereof high, and a process for producing such a porous silicon nitride body.

In order to attain the foregoing object, the present invention provides a porous silicon nitride body comprising columnar silicon nitride grains and an oxide bond phase and having a three-dimensionally entangled structure made up of the columnar silicon nitride grains and the oxide bond phase wherein the oxide bond phase comprises 2 to 15 wt. %, in terms of oxide based on silicon nitride, of at least one rare earth element and the porous silicon nitride body has an $SiO_2/(SiO_2+\text{rare earth element oxide})$ weight ratio of 0.012 to 0.65, an average pore size of at most 3.5 μm, and porosity x (vol. %) and three-point flexural strength y (MPa) satisfying the relationship:

$-14.4x+1300 \geq y \geq -4.8x+360$ (provided that $68 \geq x \geq 30$).

A process for producing such a porous silicon nitride body according to the present invention comprises: compacting a compact comprising a silicon nitride powder, 2 to 15 wt. %, in terms of oxide based on silicon nitride, of at least one rare earth element, and an organic binder while controlling the oxygen content and carbon content of the compact; and sintering the compact in an atmosphere comprising nitrogen at 1,650° to 2,200° C. to obtain a porous body comprising columnar silicon nitride grains and an oxide bond phase and having a three-dimensionally entangled structure made up of the columnar silicon nitride grains and the oxide bond phase in which the porous body has a $SiO_2/(SiO_2+\text{rare earth element oxide})$ weight ratio of 0.012 to 0.65.

In the foregoing process for producing a porous silicon nitride body, the strength properties thereof can be further improved by sintering under a gas pressure of at least 50 atm at 1,650° to 2,200° C. Specifically, the porous silicon nitride body thus obtained contains an oxide bond phase comprising 2 to 15 wt. %, in terms of oxide based on silicon nitride, of at least one rare earth element; and has an $SiO_2/(SiO_2+\text{rare earth element oxide})$ weight ratio of 0.012 to 0.65, an average pore size of at most 3 μm, and porosity x (vol. %) and three-point flexural strength y (MPa) satisfying the relationship:

$-14.4x+1300 \geq y \geq -8.1x+610$ (provided that $50 \geq x \geq 30$)

$-14.4x+1300 \geq y \geq -6.5x+530$ (provided that $68 \geq x \geq 50$).

DETAILED DESCRIPTION OF THE PREFERRED EMBODIMENTS

It has been found out that control of the $SiO_2/(SiO_2+\text{rare earth element oxide})$ weight ratio in the range of 0.012 to 0.65 in connection with $SiO_2$ and the rare earth element oxide contained in the porous body obtained after sintering is effective as a means for further improving the strength of a porous $Si_3N_4$ body while keeping the porosity thereof high. It has also been found out that control of the atmospheric gas pressure at a level of at least 50 atm during sintering can further improve the properties of a porous $Si_3N_4$ body obtained through direct hot isostatic press (HIP) sintering under such a high gas pressure without encapsulation of a compact while using an HIP apparatus in particular.

In the present invention, the added rare earth element oxide forms a liquid phase together with $SiO_2$ present on the surfaces of the $Si_3N_4$ powder through a eutectic reaction at a high temperature to melt part of the $Si_3N_4$ powder to thereby serve to precipitate columnar $Si_3N_4$ grains as described hereinbefore. In this case, when the $SiO_2/(SiO_2+\text{rare earth element oxide})$ weight ratio in connection with $SiO_2$ and the rare earth element oxide contained in the sintered body is controlled in the range of 0.012 to 0.65, there can be obtained a porous body very high in comprises $\beta$-$Si_3N_4$ crystals in a well developed hexagonal columnar form.

More specifically, there can be obtained a high-strength porous $Si_3N_4$ body, the porosity x (vol. %) and three-point flexural strength y (MPa) of which satisfy the relationship of the following numerical formula 1:

|Numerical formula 1|

$-14.4x+1300 \geq y \geq -4.8x+360$ (provided that $68 \geq x \geq 30$)

Figure 1:
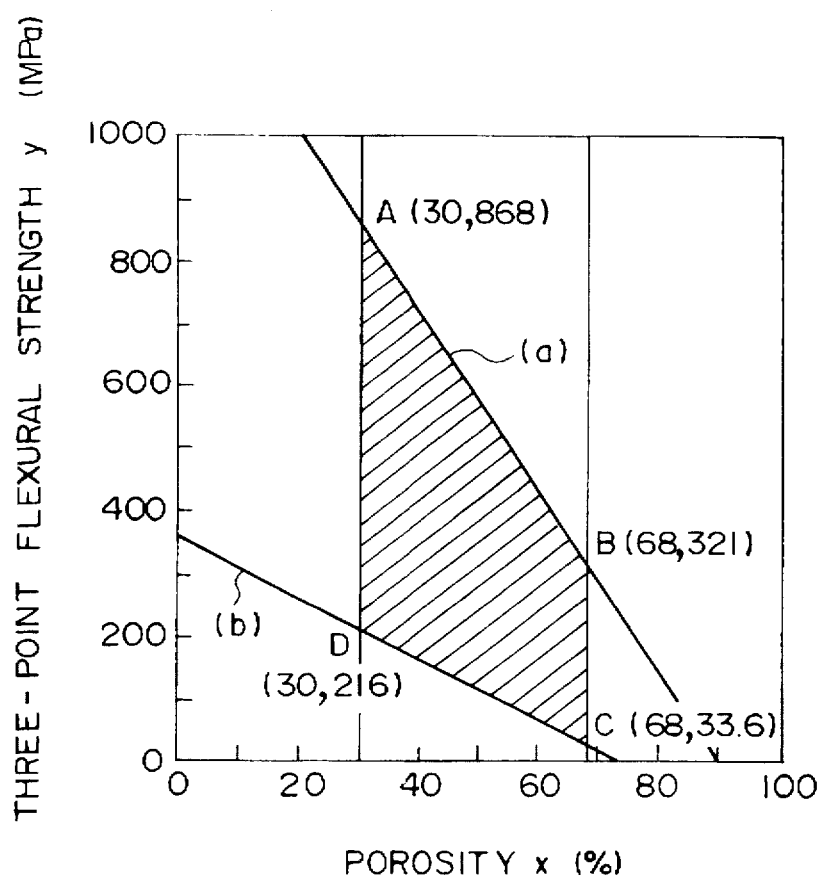
FIG. 1 is a graph showing the region satisfying the porosity versus three-point flexural strength relationship of the numerical formula 1 in the porous silicon nitride body of the present invention.

Incidentally, the region satisfying the above numerical formula 1 is shown in FIG. 1.

In the present invention, the $SiO_2/(SiO_2+\text{rare earth element oxide})$ weight ratio must be controlled in the range of 0.012 to 0.65, and is desirably controlled in the range of 0.12 to 0.42. Additionally stated, although $SiO_2$ and the rare earth element oxide are reacted with nitrogen in $Si_3N_4$ or in the atmospheric gas during sintering to exist in the form of, for example, Si—N—Y—O system compounds such as $YSiO_2N$, $YNSiO_2$, $Y_2Si_2O_7$ and $Y_2Si_3N_4O_3$ in the case where the rare earth element is Y, the value of the $SiO_2/(SiO_2+\text{rare earth element oxide})$ weight ratio as set forth herein is a value obtained through conversion based on the amount of all these compounds containing Si and the rare earth element. More specifically, it is calculated using the values of $SiO_2$ content and rare earth element oxide content obtained through conversion of the Si wt. % value and the rare earth element wt. % value, respectively, which are chemical analysis values of Si and the rare earth element.

When this weight ratio is lower than 0.012, the amount of $SiO_2$ is small and the liquid phase formation temperature is therefore so high that a difficulty may be encountered in liquid phase formation, whereby growth of columnar grains hardly occurs. Even if the liquid phase is formed, the viscosity of the liquid phase is so high that silicon nitride is hardly dissolved in the liquid phase with a low migration speed of the dissolved components within the liquid phase to form a so-called half-fired porous body wherein no three-dimensionally entangled structure is developed. Thus, the resulting porous body, though high in porosity, is low in strength. When this weight ratio exceeds 0.65 the other way around, the proportion of the rare earth element oxide, which promotes growth of columnar grains, is so low that columnar grains hardly grow despite formation of a sufficient amount of the liquid phase due to lowering of the liquid phase formation temperature, with the result that densification proceeds to a porosity of less than 30 vol. % to provide a low porosity and a low strength.

In order that the resulting columnar crystal grains are in a hexagonal columnar form with developed idiomorphism, the $SiO_2/(SiO_2+\text{rare earth element oxide})$ weight ratio is preferably in the range of 0.12 to 0.42. In this case, there can be obtained a porous body further high in strength. The reason for this is not elucidated, but is believed to be that growth of $Si_3N_4$ grains into a hexagonal columnar form with developed idiomorphism increases the mutual friction of columnar crystal grains to maximize the effect of entanglement thereof.

The value of the $SiO_2/(SiO_2+\text{rare earth element oxide})$ weight ratio is determined by control of the oxygen content and carbon content of the compact before sintering if the amount of the added rare earth element oxide is fixed. $SiO_2$ in the form of oxide films is present on the surfaces of the grains of the $Si_3N_4$ powder, while an organic binder containing carbon as the principal component is added in compacting. Accordingly, the above-mentioned weight ratio is controlled by adjusting the amount of $SiO_2$ as an oxygen source and the amount of the organic binder as the carbon source and varying the preparation conditions of the compact before sintering, such as compacting conditions, binder removal treatment conditions, etc. Alternatively, positive addition of an $SiO_2$ powder and/or addition and mixing of a compound convertible into carbon by heating as a carbon source, e.g., phenol, may be done.

This will be described specifically. When the compact is fired in an atmosphere comprising oxygen (generally in air) to effect binder removal treatment thereof, carbon is released as CO gas or $CO_2$ gas to decrease the carbon content in the compact by that portion, while at the same time the surfaces of the $Si_3N_4$ powder are also oxidized and converted into $SiO_2$. Thus, the $SiO_2$ content after the binder removal treatment is increased. As the binder removal treatment temperature is raised, and as the treatment time is lengthened, the carbon content is decreased, while the $SiO_2$ content is increased. Under the same binder removal conditions, the larger the amount of the organic binder added when compacting, the higher the carbon content. Additionally stated, when the binder removal temperature exceeds 1,000° C., the surface oxidation of the $Si_3N_4$ powder is liable to rapidly proceed. On the other hand, when it is lower than 200° C., the binder is hard to remove from the compact unless the treatment time is lengthened. Thus, the binder removal treatment is desirably effected in the temperature range of 200° to 1,000° C.

The $SiO_2$ content can also be varied by the compacting method. For example, when extrusion is done using water as a solvent, the surfaces of the $Si_3N_4$ powder are oxidized during extrusion to increase the $SiO_2$ content. On the other hand, when dry compacting is done using an alcohol as a solvent, the $SiO_2$ content can be lowered.

When the compact after the binder removal treatment, which is controlled in $SiO_2$ content and carbon content by appropriate selection or combination of the preparation conditions of the compact such as compacting conditions, binder removal treatment conditions, etc., is heated in nitrogen for sintering, the residual carbon is reacted with $SiO_2$ on the surfaces of the $Si_3N_4$ powder in keeping with heat-up of the compact to generate CO gas with a decrease in the $SiO_2$ content thereof (reduction of $SiO_2$ with carbon). Thus, the $SiO_2/(SiO_2+$rare earth element oxide) weight ratio in connection with $SiO_2$ and the rare earth element oxide in the resulting sintered body is determined by controlling the carbon content and oxygen content of the compact before sintering.

The $Si_3N_4$ powder to be used in the present invention is preferably amorphous or of α-type, although the $Si_3N_4$ powder may partially contain a β-type one. When the $Si_3N_4$ powder is wholly composed of β-type grains, no columnar grains are formed. Meanwhile, as the grain size of the $Si_3N_4$ powder is decreased, the pore size is decreased and the strength is enhanced. When a trace amount of an impurity element such as for example Al is mixed in the $Si_3N_4$ powder to be used or the rare earth element oxide as a sintering aid, part of $Si_3N_4$ is sometimes converted into compounds such as $Si_3Al_2O_7N$, which however do not particularly involve troubles.

Meanwhile, yttrium is not only inexpensive and hence easily available, but also greatly effective in improving the strength. Although as the method of adding the rare earth element, the rare earth element or elements are usually added in the form of oxide powder, use of a rare earth element alkoxide enables it to be more homogeneously mixed with the $Si_3N_4$ powder, whereby a further strengthened porous body can be obtained.

The sintering temperature is suitably 1,650° to 2,200° C. The higher the temperature, the higher the effect of improving the strength. When the sintering temperature is too high, however, not only does poor economy ensue therefrom, but also growth of grains occurs to increase the pore size, whereby the strength is, the other way around, liable to lower. Thus, a sintering temperature of up to 2,000° C. is preferable. On the other hand, when the sintering temperature is lower than 1,650° C., no columnar grains are formed.

As for the gas pressure during sintering, application of a pressure not substantially allowing $Si_3N_4$ to sublime during sintering, for example, a pressure of up to about 10 atm, will usually suffice. The higher the gas pressure, the higher the strength of the resulting porous body. Sintering is preferably effected under a pressure of at least 50 atm to obtain a porous body having a higher strength as well as a high porosity. Such an effect is remarkably exhibited under a pressure of at least 100 atm in particular. Additionally stated, although an apparatus called "Sinter-HIP" can well cope with sintering under a pressure of at most 100 atm, an HIP apparatus for exclusive use must be used when the pressure exceeds 100 atm. The upper limit of the pressure is generally intended to be 2,000 atm, which is the upper limit in existing HIP apparatuses.

High gas pressure sintering represented by HIP sintering has heretofore been employed for vanishing final pores in production of a dense ceramic. More specifically, pores remaining in a ceramic densified to a porosity of at least 95% by primary sintering (under ordinary pressure) are vanished under a high gas pressure during HIP sintering. By contrast, it has been found out that a porous body having a very high strength can be obtained by applying high gas pressure sintering directly to a $Si_3N_4$ compact with the foregoing control of the $SiO_2$ content, the carbon content and the rare earth element oxide content as in the present invention. Additionally stated, when HIP sintering is employed in the present invention, HIP sintering is effected directly in a gas atmosphere without encapsulation of the compact.

When the atmospheric gas pressure is set at 50 atm or higher during sintering as described above, there can be obtained a higher-strength porous $Si_3N_4$ body, the porosity x (vol. %) and three-point flexural strength y (MPa) of which satisfy the following numerical formula 2:

[Numerical Formula 2]

$-14.4x+1300 \geq y \geq -8.1x+610$ (provided that $50 \geq x \geq 30$)

$-14.4x+1300 \geq y \geq -6.5x+530$ (provided that $68 \geq x \geq 50$)

Figure 2:
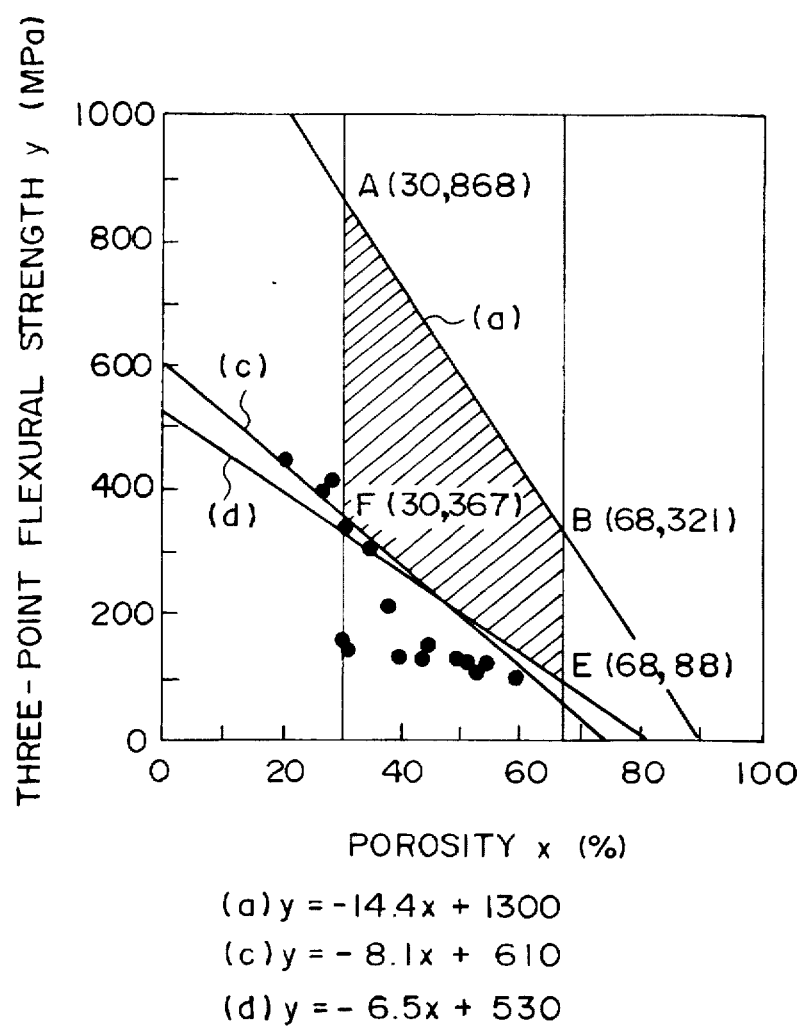
FIG. 2 is a graph showing the region satisfying the porosity versus three-point flexural strength relationship of the numerical formula 2 in the porous silicon nitride body of the present invention.
Figure 3:
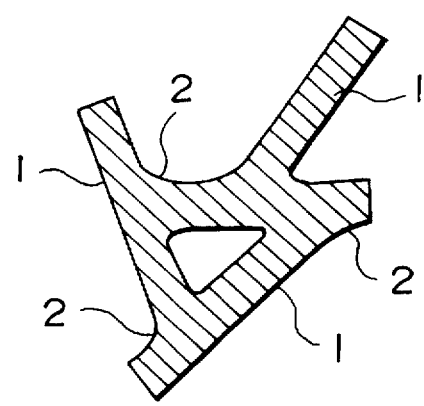
FIG. 3 is a model diagram showing a state of necking of silicon nitride grains in contact sites thereof as attained when the gas pressure is set high during sintering.

Incidentally, the region satisfying the foregoing numerical formula 2 is shown in FIG. 2. For comparison, black dots in FIG. 2 represent porosities and three-point flexural strengths attained according to PCT International Publication No. WO 94/27929.

The following explanation will be given to the effect of improving the strength of the porous body by sintering under a high gas pressure. It is believed that the high gas pressure during sintering increases the amounts of $Si_3N_4$ and nitrogen gas dissolved in the liquid phase and simultaneously activates the diffusion of the dissolved Si and N components to advance mutual necking of hexagonal columnar crystal grains in the contact sites thereof, with the result that a structure having the contact sites 2 of columnar grains 1 developed can be obtained to provide a porous $Si_3N_4$ body very high in strength.

The porous $Si_3N_4$ body of the present invention obtained according to the foregoing procedure has a structure wherein columnar $Si_3N_4$ grains are three-dimensionally entangled with the oxide bond phase, and wherein the oxide bond phase contains 2 to 15 wt. %, in terms of oxide based on $Si_3N_4$, of at least one rare earth element. When the amount of the bond phase is smaller than 2 wt % in terms of oxide, columnar grains with developed idiomorphism (hexagonal) are not formed to lower the strength of the porous body. On the other hand, when it exceeds 15 wt. %, the amount of the grain boundary phase component low in strength is increased to lower the strength of the porous body as well.

Meanwhile, the average pore size of the porous $Si_3N_4$ body is at most 3.5 μm, preferably at most 3 μm, while the porosity thereof is in the range of 30 to 68 vol. %. When the average pore size exceeds 3.5 μm, the strength is lowered. The lower limit of the average pore size is not particularly limited because it is determined by the grain size of the $Si_3N_4$ powder as a starting material. However, the lower limit is 0.05 μm when a commercially available $Si_3N_4$ powder is used, but this does not apply to the case where such a powder is specially prepared. A porous body having a porosity of less than 30 vol. % is hard to produce according to the process of the present invention in an aspect of the relationship between the grain growth rate and the densification speed. When the porosity exceeds 68 vol. %, the shape of the compact cannot be maintained during compacting because the porosity is too high.

Although the foregoing porous $Si_3N_4$ body of the present invention shows sufficiently high strength properties as a structural member, it is so easily machinable that it can be smoothly cut, severed, perforated, channeled, etc. into an arbitrary shape with a cutting tool having an edge made of either common carbon steel or alloy steel, e.g., a drill, a saw, or a cutting tool, without cracking, chipping, etc. as if common wood is cut.

Further, the porous $Si_3N_4$ body of the present invention is so low in Young's modulus for its high strength that it has a feature of excellent impact absorption. Young's modulus is lowered with an increase in porosity. The porous $Si_3N_4$ body of the present invention has a Young's modulus in the range of 15 GPa (porosity: 68 vol. %) to 100 GPa (porosity: 30 vol. %). This porous $Si_3N_4$ body is also so low in thermal conductivity that it can be used as a heat insulating material. The porous $Si_3N_4$ body of the present invention especially satisfies the following relationship between the thermal conductivity z (W/mK) and the porosity x (vol. %):

$$z \geq -0.15x+9.5$$

Further, when the porosity of the porous $Si_3N_4$ body becomes 40 vol. % or higher, the dielectric constant thereof becomes 3.6 or lower. $Si_3N_4$ is a material having a low dielectric constant (ε) (ε=7.6) among various ceramics. Further, the dielectric constant of a ceramic is lowered as the porosity thereof is increased. In view of the foregoing, a porous $Si_3N_4$ body has been a greatly hoped-for low-dielectric-constant body. The porous $Si_3N_4$ body of the present invention is a material having such a very high strength that no conventional low-dielectric-constant materials have, and is low in dielectric loss to the extent of no problem in practical use.

Thus, the porous silicon nitride body of the present invention is a material balanced between the porosity and strength thereof at a very high level. Accordingly, when a filter is produced by making the most of the features of the porous body, the filter can be set to have a small thickness, and can exhibit a high permeability performance due to the high porosity thereof. Further, the porous body can serve as a lightweight high-strength ceramic capable of exhibiting a high performance as a variety of structural members such as automotive parts. Furthermore, since the porous body is a so-called machinable ceramic, which can be machined freely, it can contribute to a great reduction of the working cost, which accounts for a major proportion of the production cost of a ceramic part.

Since the porous $Si_3N_4$ body of the present invention is also endowed with a low dielectric constant and high strength properties, it is effective as a substrate material little in transmission loss in a high frequency range like that of millimeter waves. Besides, it can be utilized as a high-performance radar transmission material.

Further, when the porous $Si_3N_4$ body of the present invention is used as a friction material under oil lubrication conditions in a further application thereof, the friction coefficient thereof can be expected to be lowered due to infiltration of oil into pores thereof. Besides, it can be used as a sound absorbing material for use in road walls and the like, and as a wall material for use in houses and the like by making the most of its merits, i.e., a light weight, a high porosity, a high strength and a low thermal conductivity.

The following examples illustrate the present invention more specifically. The proportions of the compounds of rare earth elements used in the examples are expressed by weight % in terms of oxides based on silicon nitride, unless otherwise indicated.

EXAMPLE 1

An $\alpha$-$Si_3N_4$ powder of 0.4 μm in average grain size was blended with a $Y_2O_3$ powder of 0.015 μm in average grain size or $Y(OC_2H_5)_3$ as a Y alkoxide at a proportion as shown in Table 1, and further admixed with 15 wt. %, based on the sum of the foregoing powders, of methylcellulose as an organic binder. The resulting mixed powder was compacted to have a relative density of 44%. Each compact was heated in air at 500° C. for 1 hour to effect binder removal treatment thereof, and then fired in a nitrogen gas atmosphere under sintering conditions as shown in Table 1 to obtain a porous $Si_3H_4$ body. Additionally stated, the used $Si_3N_4$ powder contained 2.25 wt. % of $SiO_2$ as a surface oxide film.

TABLE 1

| | Sintering Aid | | Sintering Conditions | | |
|---|---|---|---|---|---|
| Sample | Kind | wt. % | Temp. (°C.) | Time (hr) | Pressure (atm) |
| 1* | $Y_2O_3$ | 1.9 | 1800 | 2 | 5 |
| 2 | $Y_2O_3$ | 2 | 1800 | 2 | 5 |
| 3 | $Y_2O_3$ | 3 | 1800 | 2 | 1000 |
| 4 | $Y_2O_3$ | 4.5 | 1800 | 2 | 5 |
| 5 | $Y_2O_3$ | 4.5 | 1800 | 2 | 49 |
| 6 | $Y_2O_3$ | 4.5 | 1800 | 2 | 51 |
| 7 | $Y_2O_3$ | 4.5 | 1800 | 2 | 120 |
| 8 | $Y_2O_3$ | 4.5 | 1800 | 2 | 1000 |
| 9 | $Y_2O_3$ | 8 | 1800 | 2 | 2000 |
| 10 | $Y_2O_3$ | 15 | 1800 | 2 | 2000 |
| 11 | $Y_2O_3$ | 16.7 | 1800 | 2 | 2000 |
| 12 | $Y(OC_2H_5)_3$ | 8 | 2000 | 5 | 1000 |
| 13 | $Y(OC_2H_5)_3$ | 8 | 2000 | 7 | 1000 |
| 14 | $Y(OC_2H_5)_3$ | 8 | 2000 | 8 | 2000 |

(Note) The sample with * in the table is of Comparative Example.

The following experiments were carried out for each porous $Si_3N_4$ body sample thus obtained.

(1) $SiO_2$/($SiO_2$+rare earth element oxide) weight ratio:
This was examined by chemical analysis of the porous $Si_3N_4$ body.

(2) Porosity and Average Pore Size: They were measured with a mercury porosimeter.

(3) Flexural Strength: The flexural strength at room temperature was measured by a three-point flexural strength test in accordance with JIS 1601.

(4) Young's Modulus: This was calculated from a stress-strain curve obtained in the flexural strength test.

(5) Fuel Consumption: The porous $Si_3N_4$ body was worked into a tappet shim of 30 mm in diameter and 5 mm in thickness, which was then mirror-polished to a degree of surface roughness Ra=0.01 µm, then assembled with a steel cam shaft, and installed in a gasoline engine car of 1,500 cc displacement, followed by examination of the 10 mode fuel consumption thereof.

The results are shown in the following Table 2. For comparison, the fuel consumption was examined using a dense $Si_3N_4$ (strength: 1,500 MPa, specific gravity: 3.24) as well as steel tappet shim in the same manner as described above. The results are also shown in Table 2.

TABLE 3

| | Sintering Aid | | Sintering Conditions | | |
| Sample | Kind | wt. % | Temp. (°C.) | Time (hr) | Pressure (atm) |
| --- | --- | --- | --- | --- | --- |
| 17* | $CeO_2$ | 8 | 1600 | 2 | 1000 |
| 18 | $CeO_2$ | 8 | 1650 | 2 | 1000 |
| 19 | $CeO_2$ | 8 | 1750 | 8 | 1000 |
| 20 | $CeO_2$ | 8 | 1750 | 6 | 1000 |
| 21 | $CeO_2$ | 8 | 1750 | 4 | 1000 |
| 22 | $CeO_2$ | 8 | 1750 | 2.5 | 1000 |
| 23 | $CeO_2$ | 8 | 1990 | 2 | 1000 |
| 24 | $Nd_2O_3$ | 8 | 1990 | 2 | 1000 |
| 25 | $Gd_2O_3$ | 8 | 1990 | 2 | 1000 |
| 26 | $Dy_2O_3$ | 8 | 1990 | 2 | 1000 |
| 27 | $Yb_2O_3$ | 8 | 1990 | 2 | 2100 |
| 28 | $Yb_2O_3$ | 8 | 1990 | 5 | 2000 |

(Note) The sample with * in the table is of Comparative Example.

TABLE 2

| Sample | $SiO_2/(SiO_2 +$ rare earth element oxide) | Porosity (%) | Pore Size (µm) | Young's Modulus (GPa) | Flexural Strength (MPa) | Fuel Consumption (km/l) |
| --- | --- | --- | --- | --- | --- | --- |
| 1* | 0.54 | 54 | 1.4 | 22 | 77 | — |
| 2 | 0.53 | 54 | 1.4 | 25 | 120 | — |
| 3 | 0.43 | 51 | 1.3 | 39 | 200 | — |
| 4 | 0.33 | 50 | 1.4 | 38 | 133 | — |
| 5 | 0.33 | 50 | 1.4 | 39 | 188 | — |
| 6 | 0.33 | 48 | 1.4 | 46 | 288 | — |
| 7 | 0.33 | 45 | 1.4 | 57 | 299 | — |
| 8 | 0.33 | 40 | 1.2 | 65 | 422 | — |
| 9 | 0.22 | 38 | 1.1 | 70 | 533 | 18.4 |
| 10 | 0.13 | 38 | 1.1 | 71 | 399 | — |
| 11 | 0.119 | 39 | 1.1 | 70 | 333 | — |
| 12 | 0.22 | 32 | 0.5 | 77 | 630 | 17.3 |
| 13 | 0.22 | 31 | 0.5 | 78 | 634 | 17.1 |
| 14 | 0.22 | 30 | 0.4 | 89 | 644 | 17.2 |
| 15* | dense $Si_3N_4$ tappet shim | | | | | 16.4 |
| 16* | steel tappet shim | | | | | 15.9 |

(Note) The samples with * in the table are of Comparative Example.

It is understandable from the above results that the porous $Si_3N_4$ body of the present invention can keep the porosity thereof high and has a very high three-point flexural strength for its porosity. It is also understandable that the porous $Si_3N_4$ body of the present invention can greatly improve the fuel consumption efficiency of a car engine when it is used as a tappet shim.

EXAMPLE 2

Substantially the same procedure as in Example 1 was repeated to provide compacts having a relative density of 44% except for use of an $\alpha$-$Si_3N_4$ powder of 3.0 µm in average grain size and a variety of rare earth element compounds of 0.005 µm in average grain size instead of $Y_2O_3$ as a rare earth element compound. Each compact thus obtained was subjected to binder removal treatment in air at 450° C. for 1.5 hours, and then sintered under a pressure of 1,000 to 2,100 atm at a temperature of 1,600° to 1,990° C. for 2 hours as shown in Table 3 to form a porous $Si_3N_4$ body. Additionally stated, the used $Si_3N_4$ powder contained 3.25 wt. % of $SiO_2$.

Each porous $Si_3N_4$ body sample thus obtained was evaluated according to the same experiments as described hereinabove. The results are shown in Table 4.

TABLE 4

| Sample | $SiO_2/(SiO_2 +$ rare earth element oxide) | Porosity (%) | Pore Size (µm) | Young's Modulus (GPa) | Flexural Strength (MPa) |
| --- | --- | --- | --- | --- | --- |
| 17* | 0.29 | 55 | 2.9 | 27 | 44 |
| 18 | 0.29 | 50 | 2.7 | 40 | 236 |
| 19 | 0.29 | 44 | 3.5 | 48 | 200 |
| 20 | 0.29 | 44 | 3.2 | 47 | 200 |
| 21 | 0.29 | 44 | 3.0 | 47 | 290 |
| 22 | 0.29 | 44 | 2.2 | 48 | 415 |
| 23 | 0.29 | 32 | 1.8 | 95 | 607 |
| 24 | 0.29 | 32 | 1.8 | 81 | 609 |
| 25 | 0.29 | 31 | 1.8 | 88 | 599 |
| 26 | 0.29 | 31 | 1.8 | 88 | 588 |
| 27 | 0.29 | 31 | 1.8 | 88 | 596 |
| 28 | 0.29 | 31 | 1.8 | 99 | 633 |

(Note) The sample with * in the table is of Comparative Example.

EXAMPLE 3

Substantially the same procedure as in Example 1 was repeated to provide compacts having a relative density of 30%, 50% or 75% except for use of an α-Si₃N₄ powder of 0.05 μm in average grain size and Er₂O₃ of 0.005 μm in average grain size instead of Y₂O₃ as a rare earth element compound. Each compact thus obtained was subjected to binder removal treatment in air at 600° C. for 1 hour, and then sintered under a pressure of 5 to 1,000 atm at a temperature of 1,850° to 2,200° C. for 2 to 2.5 hours as shown in Table 5 to form a porous Si₃N₄ body. Additionally stated, the used Si₃N₄ powder contained 3.25 wt. % of SiO₂. Samples were also prepared in the same manner as described above except that phenol in an amount of 0.4 to 0.8 wt. % based on the weight of the Si₃N₄ powder was further added a carbon source other than the organic binder.

TABLE 5

| Sample | Er₂O₃ (wt. %) | Phenol (wt. %) | Compact Density (%) | Sintering Conditions Temp. (°C.) | Time (hr) | Pressure (atm) |
|---|---|---|---|---|---|---|
| 29* | 1.7 | not added | 30 | 1850 | 2 | 5 |
| 30 | 2 | not added | 30 | 1850 | 2 | 5 |
| 31 | 2 | not added | 30 | 1850 | 2 | 1000 |
| 32 | 4 | not added | 30 | 1850 | 2 | 5 |
| 33 | 8 | not added | 30 | 1850 | 2 | 5 |
| 34 | 8 | not added | 30 | 1850 | 2 | 55 |
| 35 | 8 | not added | 30 | 1850 | 2 | 1000 |
| 36 | 8 | not added | 50 | 1850 | 2 | 1000 |
| 37 | 8 | not added | 70 | 1850 | 2.5 | 50 |
| 38 | 8 | not added | 70 | 1850 | 2.5 | 1000 |
| 39 | 15 | not added | 30 | 1850 | 2 | 5 |
| 40 | 15 | 0.4 | 30 | 1850 | 2 | 5 |
| 41 | 15 | 0.5 | 30 | 1950 | 2 | 5 |
| 42 | 15 | 0.6 | 30 | 1950 | 2 | 5 |
| 43 | 15 | 0.6 | 30 | 2200 | 2 | 56 |
| 44 | 15 | 0.6 | 30 | 2200 | 2 | 1000 |
| 45* | 15.5 | 0.8 | 30 | 2200 | 2 | 1000 |
| 46* | 16.5 | 0.8 | 30 | 2200 | 2 | 5 |

(Note) The samples with * in the table are of Comparative Example.

Each porous Si₃N₄ body thus obtained was evaluated according to the same experiments as described hereinabove. The results are shown in Table 6.

TABLE 6

| Sample | SiO₂/(SiO₂ + rare earth element oxide) | Porosity (%) | Pore Size (μm) | Flexural Strength (MPa) |
|---|---|---|---|---|
| 29* | 0.625 | 69 | 0.02 | 66 |
| 30 | 0.62 | 65 | 0.06 | 100 |
| 31 | 0.62 | 68 | 0.06 | 310 |
| 32 | 0.45 | 59 | 0.07 | 111 |
| 33 | 0.29 | 58 | 0.07 | 122 |
| 34 | 0.29 | 58 | 0.07 | 199 |
| 35 | 0.29 | 58 | 0.07 | 400 |
| 36 | 0.29 | 50 | 0.06 | 550 |
| 37 | 0.29 | 32 | 0.05 | 400 |
| 38 | 0.29 | 30 | 0.07 | 850 |
| 39 | 0.18 | 57 | 0.08 | 123 |
| 40 | 0.08 | 59 | 0.07 | 129 |
| 41 | 0.08 | 60 | 0.07 | 100 |
| 42 | 0.012 | 67 | 0.07 | 101 |
| 43 | 0.012 | 67 | 0.07 | 88 |
| 44 | 0.012 | 67 | 0.07 | 94 |
| 45* | 0.010 | 67 | 0.07 | 53 |
| 46* | 0.009 | 69 | 0.07 | 47 |

(Note) The samples with * in the table are of Comparative Example.

Regarding Samples 32 to 35 in the above Table 5, the pure water permeability performance of each porous Si₃N₄ body was measured. In the measurement, the porous body was formed into a flat plate of 25 mm in diameter and 0.1 mm in thickness, with which direct filtration was done under a feed pressure of 5 atm (atmospheric pressure on the permeate's side) to make the measurement. As a result, Samples 32 and 33 produced under a pressure of 5 atm during sintering were broken in the course of filtration, whereas Samples 34 and 35 produced under a pressure of at least 50 atm during sintering were capable of filtration without breakage. The permeate flow rate during filtration was 6.8 ml/min/cm²/atm in the case of Sample 34 and 7.0 ml/min/cm²/atm in the case of Sample 35.

EXAMPLE 4

An α-Si₃N₄ powder of 0.13 μm in average grain size was admixed with a Y₂O₃ powder of 0.3 μm in average grain size at a proportion as shown in Table 7, and further admixed with 12 wt. %, based on the whole ceramic powder, of a polyethylene glycol binder as an organic binder, followed by compacting to a compact density of 50%. Each of the resulting compacts was heated in air at 320° C. for 1 hour to effect binder removal treatment thereof, and then sintered in a nitrogen gas atmosphere under a pressure as shown in Table 7 at 1,800° C. for 2 hours to obtain a porous Si₃N₄ body. Additionally stated, the used Si₃N₄ powder contained 3.3 wt. % of SiO₂.

Each porous Si₃N₄ body sample thus obtained was evaluated according to the same experiments as described hereinabove as well as the following experiments. The results are shown in Table 7 to 9.

(6) Average Aspect Ratio: The major axes and minor axes of 50 grains arbitrarily chosen from a scanning electron microscope photomicrograph for each sample were measured to calculate the respective average values thereof and the average aspect ratio (average major axis/average minor axis) was obtained.

(7) Measurement of Thermal Conductivity: This was measured using a test piece of 10 mm in diameter and 1 mm in thickness according to the laser flash method.

(8) Machinability: A high speed steel cutting tool was installed in a lathe, with which a surface of a test piece of 100 mm in diameter cut out from each sample was shaved through a single feed motion at a revolution speed of 800 rpm to a cut depth of 1 mm and a cut length of 100 mm. The machinability was evaluated according to the three ratings: i.e., ○ for a difference of at most 0.01 mm in outer diameter between both ends, ■ for a difference of more than 0.01 mm to 0.02 mm in outer diameter therebetween, and x for a difference of more than 0.02 mm in outer diameter therebetween.

TABLE 7

| Sample | Sintering Y$_2$O$_3$ (wt. %) | Sintering Pressure (atm) | SiO$_2$/(SiO$_2$ + Y$_2$O$_3$) | Porosity (%) | Pore Size (μm) | Average Crystal Grain Size Major Axis (μm) | Average Crystal Grain Size Minor Axis (μm) | Aspect Ratio |
|---|---|---|---|---|---|---|---|---|
| 47* | 0.5 | 3 | 0.77 | 45 | 0.8 | 1 | 0.5 | 2 |
| 48* | 1 | 3 | 0.71 | 39 | 1.5 | 3 | 0.8 | 3.75 |
| 49* | 2 | 3 | 0.66 | 48 | 1.8 | 4.2 | 0.9 | 4.67 |
| 50 | 4 | 3 | 0.42 | 48 | 0.8 | 15 | 1 | 15 |
| 51 | 8 | 60 | 0.22 | 58 | 3.5 | 20 | 1.5 | 13.3 |
| 52 | 12 | 63 | 0.19 | 57 | 3.0 | 20 | 1.6 | 12.5 |
| 53 | 15 | 7 | 0.12 | 55 | 4.0 | 18 | 1.8 | 10 |
| 54* | 17 | 3 | 0.14 | 49 | 3.2 | 15 | 1.9 | 7.89 |
| 55* | 20 | 3 | 0.04 | 50 | 3.0 | 25 | 2.0 | 12.5 |

(Note) The samples with * in the table are of Comparative Example.

TABLE 8

| Sample | Flexural Strength (MPa) | Thermal Conductivity λ(W/mK) | Machinability |
|---|---|---|---|
| 47* | 40 | 5.0 | x |
| 48* | 88 | 4.4 | x |
| 49* | 99 | 3.2 | x |
| 50 | 230 | 2.7 | ○ |
| 51 | 188 | 1.6 | ○ |
| 52 | 195 | 1.7 | ○ |
| 53 | 166 | 1.5 | ○ |
| 54* | 95 | 1.6 | ○ |
| 55* | 55 | 0.3 | ■ |

(Note) The samples with * in the table are of Comparative Example.

Further, a starting Si$_3$N$_4$ material powder of 10 μm in average grain size, a starting BN material powder of 10 μm in average grain size, and a starting SiC material powder of 1 μm in average grain size were mixed with a Y$_2$O$_3$ powder of 4 μm in average grain size and an Al$_2$O$_3$ powder of 2 μm in average grain size as sintering aids at a proportion, based on the combined weight of the Si$_3$N$_4$, BN and SiC powders as shown in Table 9 and further admixed with 12 wt. %, based on all the foregoing powders, of a polyethylene glycol binder as an organic binder. The resulting mixture was compacted, and then sintered in a nitrogen gas atmosphere under a pressure of 160 kg/cm$^2$ at 1,800° C. for 1 hour. Thus, 5 kinds of Si$_3$N$_4$—BN composite materials were obtained. These samples of Comparative Example were evaluated in the same manner as described above. The results are shown in Table 9.

oxide powders of 0.4 μm in average grain size as shown in the following Table 10 as a sintering aid. The resulting mixed powder was admixed with 2 wt. %, based on the whole ceramic powder, of methylcellulose as an organic binder, and then compacted to a compact density of 50%. Each of the resulting compacts was heated in air at 800° C. for 1 hour to effect binder removal treatment thereof, and then sintered in nitrogen gas under a pressure of 500 atm at a temperature as shown in Table 10 for 2 hour to obtain a porous Si$_3$N$_4$ body. Additionally stated, the used Si$_3$N$_4$ powder contained 1.7 wt. % of SiO$_2$.

Each porous Si$_3$N$_4$ body sample thus obtained was evaluated according to the same tests as described hereinabove, and further tested for the following perforation machinability.

(9) Perforation Machinability: A perforation machinability test was carried out using a cutting tool, i.e., steel drill, at a revolution speed of 50/min to make evaluation according to the ratings: ○ for a perforated sample, ■ for a chipped sample, and x for a broken sample. The results are shown in Tables 10 and 11. The Si$_3$N$_4$—BN composite materials of Comparative Example obtained in Example 4 and a glass ceramic produced according to Table 1 in Japanese Patent Laid-Open No. 5-178641 were also tested for perforation machinability, but these comparative samples were all broken in the course of perforation machining.

TABLE 9

| Sample | Si$_3$N$_4$ (wt. %) | BN (wt. %) | SiC (wt. %) | Sintering Aid Y$_2$O$_3$ (wt. %) | Sintering Aid Al$_2$O$_3$ (wt. %) | Porosity (%) | Flexural Strength (MPa) | Machinability |
|---|---|---|---|---|---|---|---|---|
| 56* | 70 | 20 | 10 | 9 | 1 | 6 | 400 | x |
| 57* | 25 | 40 | 35 | 2 | 1 | 10 | 200 | x |
| 58* | 45 | 50 | 5 | 6 | 2 | 10 | 230 | x |
| 59* | 20 | 60 | 20 | 0.5 | 0.5 | 12 | 150 | x |
| 60* | 26 | 70 | 4 | 3 | 2 | 15 | 100 | x |

(Note) The samples with * in the table are of Comparative Example.

EXAMPLE 5

An α-Si$_3$N$_4$ powder of 0.6 μm in average grain size was admixed with 3 wt. % of a variety of rare earth element

TABLE 10

| Sample | Aid | Sintering Temp. (°C.) | SiO₂/(SiO₂ + rare earth element oxide) | Porosity (%) | Pore Size (μm) | Average Crystal Grain Size Major Axis (μm) | Average Crystal Grain Size Minor Axis (μm) | Aspect Ratio |
|---|---|---|---|---|---|---|---|---|
| 61* | La₂O₃ | 1600 | 0.36 | 48 | 0.3 | 0.9 | 0.2 | 4.5 |
| 62 | La₂O₃ | 1700 | 0.35 | 48 | 0.3 | 3.8 | 0.2 | 19 |
| 63 | La₂O₃ | 1900 | 0.35 | 39 | 0.1 | 5.0 | 0.15 | 33 |
| 64 | La₂O₃ | 2200 | 0.37 | 30 | 0.05 | 8.0 | 0.9 | 8.9 |
| 65 | Ce₂O₃ | 1700 | 0.37 | 48 | 0.2 | 3.9 | 0.3 | 13 |
| 66 | Nd₂O₃ | 1700 | 0.40 | 48 | 0.2 | 4.2 | 0.25 | 16.8 |
| 67 | Gd₂O₃ | 1700 | 0.35 | 48 | 0.2 | 3.6 | 0.3 | 12 |
| 68 | Dy₂O₃ | 1700 | 0.35 | 49 | 0.3 | 3.8 | 0.2 | 19 |
| 69 | Yb₂O₃ | 1700 | 0.37 | 49 | 0.2 | 3.9 | 0.3 | 13 |

(Note) The sample with * in the table is of Comparative Example.

TABLE 11

| Sample | Flexural Strength (MPa) | Thermal Conductivity λ(W/mK) | Perforation Machinability |
|---|---|---|---|
| 61* | 90 | 2.7 | ■ |
| 62 | 266 | 3.5 | ○ |
| 63 | 177 | 2.2 | ○ |
| 64 | 366 | 7.4 | x |
| 65 | 255 | 2.8 | ○ |
| 66 | 239 | 2.7 | ○ |
| 67 | 241 | 3.3 | ○ |
| 68 | 277 | 3.2 | ○ |
| 69 | 299 | 2.9 | ○ |

(Note) The sample with * in the table is of Comparative Example.

EXAMPLE 6

An α-Si₃N₄ powder of 0.25 μm in average grain size was admixed with a Y₂O₃ powder of 0.02 μm in average grain size, and then admixed with 12 wt. %, based on all the ceramic powders, of methylcellulose as an organic binder. The resulting mixed powder was compacted. Each compact was heated in air at 500° C. for 1 hour to effect binder removal treatment thereof, and then sintered in a nitrogen gas atmosphere under conditions as shown in the following Table 12 for 2 hours to obtain a porous Si₃N₄ body. In Comparative Example, the same procedure as described above was conducted except that 2 wt. % of an Al₂O₃ powder of 0.03 μm in average grain size and 5 wt. % of a Y₂O₃ powder of 0.02 μm in average grain size were added to the same Si₃N₄ powder as used above and sintering was carried out under conditions as shown in Table 12. Additionally stated, the used Si₃N₄ powder contained 2.0 wt. % of SiO₂.

TABLE 12

| Sample | Sintering Aid Kind (wt. %) | Compact Density (g/cm³) | Sintering Conditions Temp. (°C.) | Sintering Conditions Pressure (atm) |
|---|---|---|---|---|
| 70* | Y₂O₃(8) | 1.38 | 1830 | 4 |
| 71 | Y₂O₃(8) | 1.4 | 1830 | 5 |
| 72 | Y₂O₃(8) | 1.4 | 1830 | 50 |
| 73 | Y₂O₃(8) | 1.45 | 1830 | 52 |
| 74 | Y₂O₃(8) | 1.5 | 1830 | 60 |
| 75 | Y₂O₃(8) | 1.6 | 1830 | 5 |
| 76 | Y₂O₃(8) | 1.6 | 1830 | 66 |
| 77 | Y₂O₃(8) | 1.7 | 1830 | 50 |
| 78 | Y₂O₃(8) | 1.75 | 1830 | 120 |
| 79 | Y₂O₃(8) | 1.8 | 1830 | 150 |
| 80* | Y₂O₃(5) + Al₂O₃(2) | 1.6 | 1400 | 4 |
| 81* | Y₂O₃(5) + Al₂O₃(2) | 1.6 | 1500 | 4 |
| 82* | Y₂O₃(5) + Al₂O₃(2) | 1.6 | 1600 | 4 |

(Note) The samples with * in the table are of Comparative Example.

Each porous Si₃N₄ body sample thus obtained was evaluated according to the same tests as described hereinabove, and further subjected, using a resonator, to measurement of dielectric constant and dielectric loss at a frequency of 1 GHz, which were calculated from a resonance frequency. The results are shown in Table 13.

TABLE 13

| Sample | SiO$_2$/(SiO$_2$ + rare earth element oxide) | Porosity (%) | Pore Size (μm) | Aspect Ratio | Flexural Strength (MPa) | Dielectric Constant ε | Dielectric Loss (×10$^{-3}$) |
|---|---|---|---|---|---|---|---|
| 70* | 0.20 | 70 | 0.5 | 19 | 48 | 2.44 | 1.00 |
| 71 | 0.21 | 65 | 0.36 | 20 | 80 | 2.53 | 0.99 |
| 72 | 0.21 | 65 | 0.38 | 20 | 120 | 2.53 | 0.98 |
| 73 | 0.22 | 60 | 0.33 | 21 | 165 | 2.69 | 0.96 |
| 74 | 0.20 | 55 | 0.3 | 18 | 200 | 2.87 | 0.99 |
| 75 | 0.22 | 50 | 0.22 | 19 | 170 | 3.07 | 0.96 |
| 76 | 0.22 | 50 | 0.2 | 20 | 250 | 3.07 | 0.94 |
| 77 | 0.22 | 45 | 0.15 | 17 | 300 | 3.30 | 0.88 |
| 78 | 0.22 | 40 | 0.11 | 16 | 459 | 3.57 | 0.93 |
| 79 | 0.20 | 38 | 0.1 | 19 | 488 | 3.63 | 0.88 |
| 80* | — | 50 | 0.2 | 1 | 45 | 3.65 | 1.22 |
| 81* | — | 45 | 0.2 | 1 | 80 | 3.91 | 1.33 |
| 82* | — | 35 | 0.15 | 1 | 150 | 4.56 | 1.06 |

(Note) The samples with * in the table are of Comparative Example.

According to the present invention, there can be provided an easily machinable porous silicon nitride body having a very high strength despite its high porosity and a lightweight. Further, this porous silicon nitride body is low in Young's modulus and hence excellent in impact absorptivity, and low in thermal conductivity and hence excellent in heat insulating properties. Accordingly, the porous silicon nitride body of the present invention is useful not only as a filter for separation of a liquid or a gas as a matter of course, but also as a heat insulating material, a sound absorbing material and a variety of structural materials for automobile parts and the like. Besides, it enables the working cost to be greatly lowered.

Since the porous silicon nitride body of the present invention also has a feature of low dielectric constant, it is effective as a radar transmission material, and can be utilized as an electronic part substrate material such as a substrate material low in transmission loss at a high frequency like that of millimeter waves.

What is claimed is:

1. A high-strength porous silicon nitride body comprising columnar silicon nitride grains and an oxide bond phase and having a three-dimensionally entangled structure made up of said columnar silicon nitride grains and said oxide bond phase wherein said oxide bond phase comprises 2 to 15 wt. %, in terms of oxide based on silicon nitride, of at least one rare earth element and said porous silicon nitride body has an SiO$_2$/(SiO$_2$+rare earth element oxide) weight ratio of 0.012 to 0.65, an average pore size of at most 3 μm, and porosity x (vol. %) and three-point flexural strength y (MPa) satisfying the relationship:

$-14.4x+1300 \geq y \geq -8.1x+610$ (provided that $50 \geq x \geq 30$)

$-14.4x+1300 \geq y \geq -6.5x+530$ (provided that $68 \geq x \geq 50$).

2. A high-strength porous silicon nitride body as claimed in claim 1, in which said SiO$_2$/(SiO$_2$+rare earth element oxide) weight ratio is 0.12 to 0.42.

3. A high-strength porous silicon nitride body as claimed in claim 1, in which the thermal conductivity z (W/mK) and porosity x (vol. %) thereof satisfy the relationship:

$z \geq -0.15x+9.5$.

4. A high-strength porous silicon nitride body as claimed in claim 1, in which the Young's modulus thereof is 15 to 100 GPa.

5. A high-strength porous silicon nitride body as claimed in claim 1, in which the porosity thereof is 40 to 68 vol. % and the dielectric constant thereof is at most 3.6.

6. A high-strength porous silicon nitride body as claimed in claim 1, in which said porous silicon nitride body can be cut with a cutting tool made using an alloy steel or carbon steel.

7. A high-strength porous silicon nitride body as claimed in claim 1, in which said rare earth element is yttrium.

8. A process for producing a high-strength porous silicon nitride body of claim 2, comprising: compacting a compact comprising a silicon nitride powder, 2 to 15 wt %, in terms of oxide based on silicon nitride, of at least one rare earth element, and an organic binder while controlling the oxygen content and carbon content of said compact; and sintering said compact in an atmosphere comprising nitrogen at 1,650° to 2,220° C. and a pressure of at least 50 atmospheres to obtain a porous body comprising columnar silicon nitride grains and an oxide bond phase and having a three-dimensionally entangled structure made up of said columnar silicon nitride grains and said oxide bond phase in which said porous body has an SiO$_2$/(SiO$_2$+rare earth element oxide) weight ratio of 0.012 to 0.65.

9. A process for producing a high-strength porous silicon nitride body as claimed in claim 8, in which said compact contains an SiO$_2$ powder as an oxygen source and/or a compound convertible into carbon by heating as a carbon source.

10. A process for producing a high-strength porous silicon nitride body as claimed in claim 8, in which the oxygen content and carbon content of said compact are controlled to obtain a porous body having an SiO$_2$/(SiO$_2$+rare earth element oxide) weight ratio of 0.12 to 0.42 after said sintering.

11. A process for producing a high-strength porous silicon nitride body as claimed in claim 8, in which said rare earth element is yttrium.

* * * * *